UNITED STATES PATENT OFFICE.

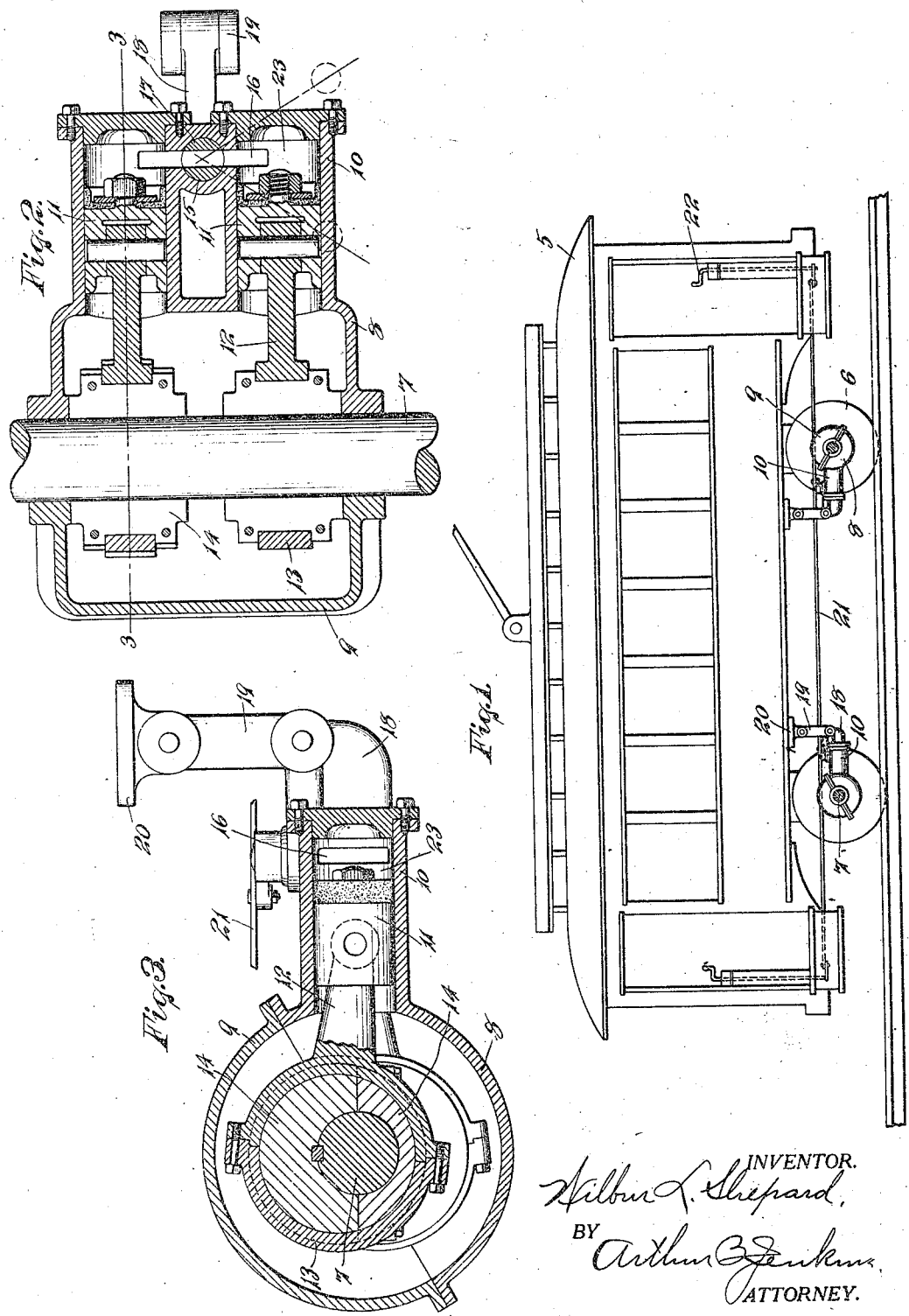

WILBUR L. SHEPARD, OF WEST HARTFORD, CONNECTICUT, ASSIGNOR TO THE WORLD GAS ENGINE COMPANY, OF HARTFORD, CONNECTICUT, A CORPORATION OF MAINE.

BRAKE MECHANISM.

1,297,600.

Specification of Letters Patent.

Patented Mar. 18, 1919.

Application filed May 5, 1917. Serial No. 166,784.

*To all whom it may concern:*

Be it known that I, WILBUR L. SHEPARD, a citizen of the United States, a resident of West Hartford, in the county of Hartford and State of Connecticut, have invented a new and Improved Brake Mechanism, of which the following is a specification.

My invention relates especially to devices that are used to stop or decrease the momentum of vehicles, and an object of my invention, among others, is to provide a device of this class that shall be particularly efficient in its operation, and simple and cheap in construction.

One form of brake embodying my invention and in the construction and use of which the objects herein set out, as well as others, may be attained, is illustrated in the accompanying drawings, in which:

Figure 1 is a view of a vehicle showing my improved brake attached thereto.

Fig. 2 is a detail view in section through my improved brake on a horizontal plane passing through and coincident with the axis of the axle, the scale being enlarged.

Fig. 3 is a view in cross section through the device on plane denoted by dotted line 3—3 of Fig. 2.

While my invention is not restricted in its use to any specific form of vehicle, as it may be readily applied to automobiles, trolley cars and the like, as one means of illustrating its construction in operation I have selected a trolley car for this purpose. In the accompanying drawings the numeral 5 indicates a trolley car in general which has wheels 6 that support axles 7 in a manner common to vehicles of this kind.

My improved braking device includes a case 8 that is preferably formed in two parts and including a cap 9 which is secured in place in any suitable manner. Cylinders 10 extend from the case, in the construction herein shown there being two of these cylinders located side by side and on one side of the case. Pistons 11 of any suitable form and construction are located in the cylinders and they are connected as by means of pitmen 12 with straps 13 of eccentrics 14, these parts all being of a suitable form and construction common to devices of a similar nature whereby rotatable movement of the axle 7 will impart reciprocating movement to the pistons 11. The eccentrics are so arranged that the pistons will move in opposite directions one with respect to another.

A valve chamber 15 is located in the casing structure between the pistons, the casing, in fact, comprising the cylinders, and this chamber communicates as by ports 16 with each of the cylinders, and a valve 17 located within the valve chamber controls movement of fluid between the chambers in the cylinders. An arm 18 is secured to and extends from one end of the casing, this arm preferably being attached between the cylinders. It is pivotally connected with a link 19 suspended from a bracket 20 secured to the under surface of the vehicle. The valve 17 is suitably connected with a valve operating rod 21 that is connected to be operated as by means of a handle 22 located in any convenient position upon the vehicle, the connection between the rod and valve being such that the valve will be rotated by a reciprocating movement of the rod and have an opening or closing movement imparted thereto.

Each eccentric 14 is secured to the shaft 7 to rotate therewith, and in the operation of the device chambers 23 in the inner ends of the cylinders are filled, or partially filled, with a liquid, as oil. The reciprocating movement of the pistons, one moving outwardly while the other is moving inwardly, this movement being imparted by said eccentrics, will cause the liquid to be shifted from one to the other of the chambers 23. By operating the valve 17, as by means of the handle 22, this flow of liquid will be impeded or accelerated, and when impeded, as by a closing movement of the valve, movement of the pistons will be restricted and a load will, therefore, be placed upon the axle 7. If the valve be entirely closed and flow of liquid stopped rotative movement of the axle 7 will be stopped.

It will, therefore, be seen that my improved device provides a very efficient means for retarding the movements of a vehicle, the device being extremely simple both in construction and operation, and one that may be readily attached, not only to vehicles in the process of construction, but also to those which are already in use.

In accordance with the provisions of the patent statutes, I have described the principles of operation of my invention, together with the apparatus which I now consider to represent the best embodiment thereof; but I desire to have it understood that the apparatus shown is only illustrative, and that the invention can be carried out by other means.

I claim—

1. A brake mechanism for a vehicle including a case supported by the vehicle, a brake mechanism inclosed within said case and including a plural number of cylinders, pistons mounted in said cylinders, connections with said pistons to impart reciprocating movement thereto, a channel for flow of fluid between the cylinders, means for retarding the flow of fluid through said channel, in combination with an axle, and means connected with said axle and said connections whereby rotative movement of the axle will impart reciprocating movement to said pistons.

2. A brake for a vehicle including an axle, a casing surrounding the axle and embodying a plural number of cylinders, pistons mounted in said cylinders, eccentrics secured to said axle and operatively connected with said pistons, a channel for flow of fluid between the cylinders, and means for retarding the flow of fluid through said channel.

3. A brake for a vehicle including an axle, a casing including two cylinders arranged side by side at one side of the axle, said casing inclosing a portion of the axle, eccentrics secured to the axle, pistons mounted in said cylinders and operatively connected with the eccentrics, a channel extending between said cylinders, and means for retarding the flow of fluid through said channel.

4. A brake for a vehicle including an axle, a casing surrounding said axle and including a cap applied to the main part of the casing from one side of the axle, the plane of division between the cap and main part of the casing passing through the axle, cylinders included in said casing and located opposite said cap, pistons located in the cylinders, eccentrics secured to the axle and operatively connected with said pistons, a channel extending between the cylinders, and means for retarding the flow of fluid through said channel.

5. A brake for a vehicle including an axle, a casing mounted on and surrounding a portion of the axle, said casing including cylinders, a connection between said casing and the body of the vehicle to hold the casing against rotation, pistons located in said cylinders, connections between the axle and pistons whereby the latter receives reciprocating movement from the rotative movement of the axle, a channel extending between said cylinders, and means for retarding flow of fluid through said channel.

6. A brake for a vehicle including an axle, a casing mounted on said axle and inclosing a portion thereof, cylinders included in said casing and located side by side on one side of the axle, an arm projecting from said cylinders, a loose connection between the cylinders and body of the vehicle, pistons located in said cylinders, connections between the pistons and axle whereby rotative movement of the latter imparts reciprocating movement to the pistons, a channel extending between said cylinders, and means for retarding the flow of fluid through said channel.

7. A brake for a vehicle including an axle, a casing supported on said axle and inclosing a portion thereof, said casing comprising a cap applied to the main part of the casing from one side of the axle, the line of division between the main part of the casing and cap passing through the axis of the axle, cylinders located on the opposite side of the axle from said cap, pistons located in the cylinders, connections between the axle and pistons whereby rotative movement of the axle imparts reciprocating movement to the pistons, a loose connection between said casing and the body of the vehicle, a channel extending between said cylinders, and means for retarding flow of fluid through said channel.

8. A brake for a vehicle including an axle, a casing surrounding a portion of said axle and comprising a cap applied to the main portion of the casing from one side of the axle, a pair of cylinders located side by side and comprising a part of said casing and located opposite said cap, an arm extending from one end of the cylinders, a link pivotally connected with said arm, a bracket secured to the vehicle and pivotally connected with said link, pistons located in said cylinders, connections between the pistons and axle whereby rotative movement of the latter communicates reciprocating movement to the pistons, a channel extending between said cylinders, and means for retarding the flow of fluid through said channel.

9. A brake for vehicles including an axle, a casing surrounding a portion of said axle and embodying a cap applied to the main part of the casing from one side of the axle, a pair of cylinders comprising a part of the casing and projecting from the main part thereof opposite said cap, pistons located in said cylinders, connecting means between the axle and pistons whereby rotative movement of the axle will impart reciprocating movement to the pistons, a valve chamber between the cylinders, a channel extending between the cylinders through said valve chamber, a valve located in said chamber, a rod extending underneath the vehicle and connected with said valve, means for imparting reciprocating movement to said rod, an arm projecting from said casing between said cylinders, a link pivotally connected to said arm, and a bracket secured to the body of the vehicle and pivotally connected with said link.

WILBUR L. SHEPARD.